Dec. 5, 1961 L. A. ARCHER 3,012,133
AIR AND LIGHT DISTRIBUTOR UNIT
Filed Oct. 7, 1959 3 Sheets-Sheet 1
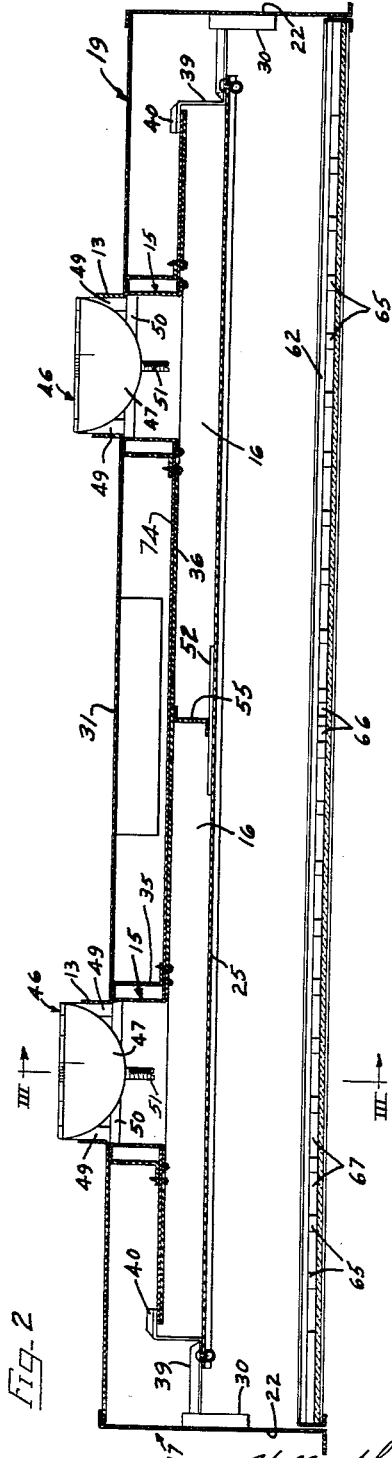
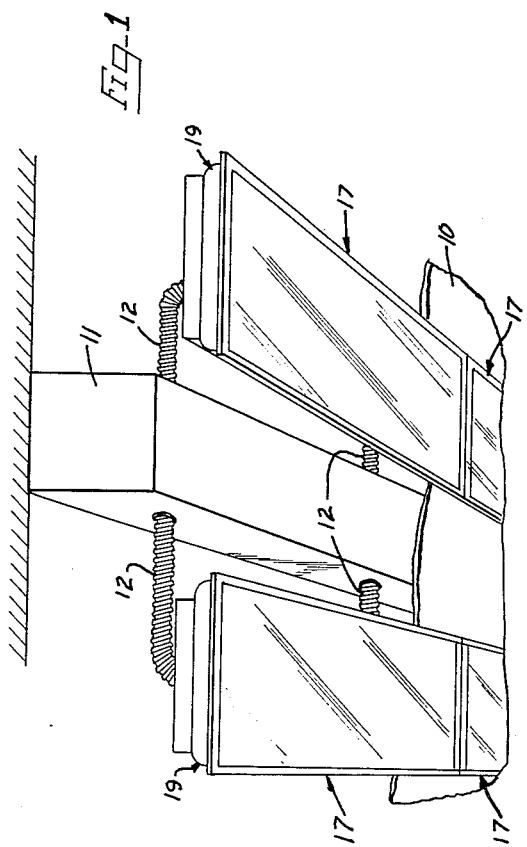
INVENTOR
Lee A. Archer
BY
ATTORNEY

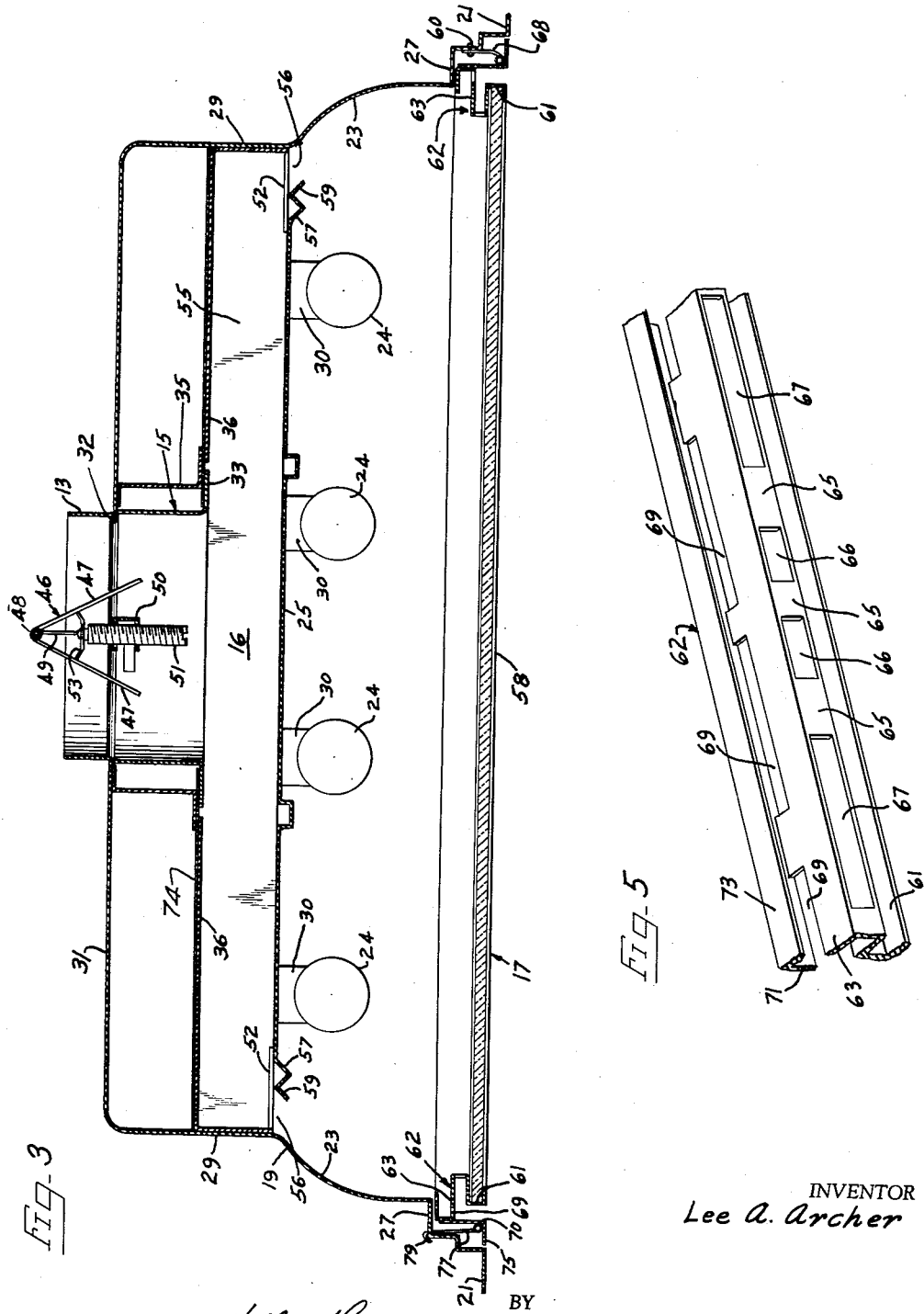

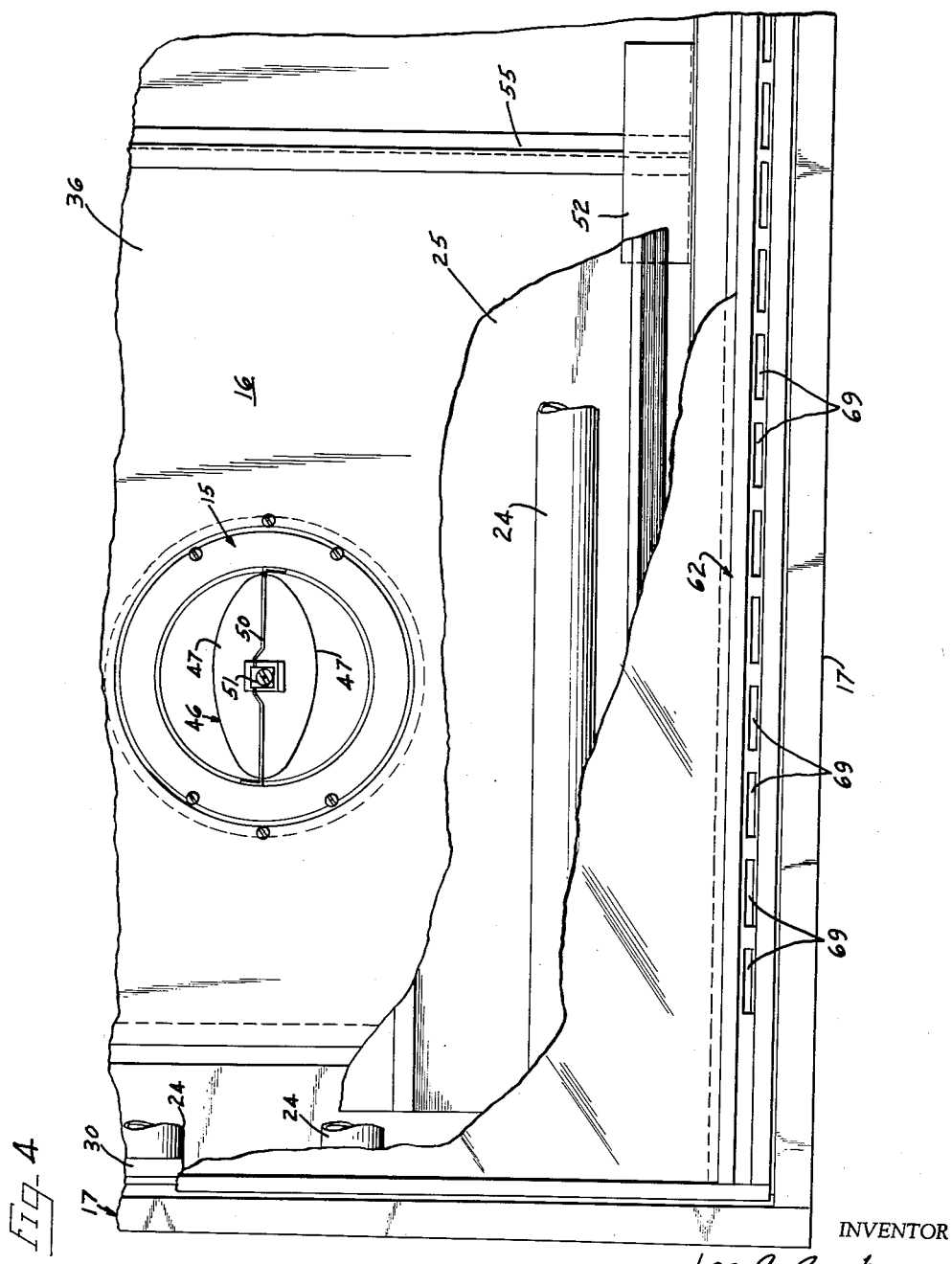

United States Patent Office 3,012,133
Patented Dec. 5, 1961

3,012,133
AIR AND LIGHT DISTRIBUTOR UNIT
Lee A. Archer, Wheaton, Ill., assignor to The Pyle-National Company, a corporation of New Jersey
Filed Oct. 7, 1959, Ser. No. 844,984
11 Claims. (Cl. 240—9)

This invention relates generally to a combined air and light distributor unit, particularly characterized by the utilization of means forming a combined light-reflector and air distributing surface in registry with a light source and having communication with a source of ventilating air at increased pressure whereby a space will be ventilated concurrently with the reflection of the light rays off the surface of the distributing unit into the same space.

It is an object of the present invention to provide a simplified and improved air and light distributor unit of the class described arranged with a view toward uniformly distributing and mixing the ventilating air with the air in a room and increasing the air circulating capacity of the unit as well as avoiding drafts that may be caused by the circulating air.

Another object of the invention is to provide a novel air and light distributor unit of the class described, so arranged as to accommodate an increased circulation of air and to direct the air in a straight down direction without drafts.

A still further object of the invention is to provide a combined air and light distributor unit of a type adapted to be recessed within a false ceiling substantially flush with the false ceiling, in which a glass lens extending along the bottom of the unit serves to diffuse the light, and in which a novel form of mounting is provided for the glass lens accommodating the air to be discharged straight downwardly along opposite sides of the lens and directing the air straight down into the room with a turbulent action to mix with the static air within the room.

A still further object of the invention is to provide a light and ventilating unit adapted to be recessed within a false ceiling and to be substantially flush with the ceiling, having a glass lens enclosing the bottom of the unit and a light trap for supporting the lens in the unit and so arranged as to direct the air straight downwardly into the room with a turbulent action at a low velocity head.

Still another object of the invention is to provide a combined air and light distributor unit particularly adapted for lighting and conditioning the air in rooms, having a troffer light housing having a plurality of elongated fluorescent tubes therein with a plurality of ventilating ducts leading into the troffer light housing above the fluorescent tubes into a plenum chamber and having a baffle extending transversely of the plenum chamber between the ventilating ducts and keeping the endwise components of the air down, to effect the discharge of the air from the plenum chamber straight down into the room with sufficient turbulence to mix with the static air within the room.

A further object of the invention is to provide a new and improved air and light distributor unit of the class described arranged with a view toward increasing the light and air circulating capacity of the unit and avoiding drafts and thereby increasing the efficiency of the mixture of the air discharged from the unit with the air in the room.

These and other objects of the invention will appear from time to time as the following specification proceeds and with reference to the accompanying drawings wherein:

FIGURE 1 is a fragmentary perspective view of an air and light distributor unit constructed in accordance with the invention, showing a series of air and light distributor units recessed within a false ceiling, with a main air distributor duct supplying the units, and with part of the false ceiling broken away and shown in section;

FIGURE 2 is a substantially longitudinal sectional view taken through one of the units shown in FIGURE 1;

FIGURE 3 is a transverse sectional view taken substantially along line III—III of FIGURE 2;

FIGURE 4 is a fragmentary bottom plan view of the unit with portions of the glass lens, fluorescent tubes and reflector broken away; and FIGURE 5 is a fragmentary detail view of the light trap, supporting the glass lens.

In the embodiment of the invention illustrated in the drawings, I have shown in FIGURE 1 an inner wall or false ceiling 10 spaced downwardly of the wall or ceiling of a space to be ventilated and have shown a main air duct 11 in the space between the ceiling and false ceiling. I have also shown flexible conduits 12 extending from opposite sides of the main air duct 11 and having connection with conduit portions or collars 13 of valve housings 15, leading into plenum chambers 16 of air and light distributor units 17.

As shown in FIGURES 1 and 2, two valve housings 15 are provided for each air and light distributor unit 17 and the plenum chamber 16 is divided in half, intermediate the valve housing 15 by a wall or baffle 55. The air and light distributor units 17 may be located in end-to-end relation with respect to each other and may be parallel spaced to extend along the ceiling, the number and spacing of the units depending upon the requirements for light and air.

Each air and light distributor 17 includes a troffer light housing 19, which may be generally rectangular in form and has a flange 21 extending about the margin thereof and adapted to abut the false ceiling 10, and accommodating the troffer light housing 19 to be mounted substantially flush with the false ceiling.

The troffer light housing 19, as shown in FIGURES 2 and 3 includes ends walls 22 and opposite side walls 23 extending parallel to a plurality of fluorescent tubes 24 spaced beneath a reflector 25 and mounted at their ends in mounting brackets 30, mounted on the end walls 22 at opposite ends of the troffer light housing. The mounting brackets 30 carry the usual sockets for the fluorescent tubes 24, and the usual electric circuitry is provided to effect energization of the fluorescent tubes 24 in a manner well known to those skilled in the art and no part of the present invention so not herein shown or described further.

The side walls 23 converge inwardly from shouldered portions 27 of the troffer light housing and may be coated with a light reflective material on their inner surfaces, to form light reflectors for the fluorescent tubes 24, cooperating with the reflector 25.

The side walls 23 terminate into parallel spaced vertically extending wall portions 29, turned inwardly at their upper end portions to form a cover 31 for the troffer light housing.

The cover 31 has spaced circular openings 32 formed therein to receive the conduit portions or collars 13 of the valve chambers 15. The collars 13 have flanges 33 projecting outwardly from the lower end portions thereof and extending beneath a cup 35 attached to the cover 31. An inverted pan-like member 36 having a flat top with a backing of asbestos 74 extending beneath the cup 35 forms the top of the plenum chambers 16. The pan-like member 36 extends between the side wall portions 29 and is open at its ends and is supported at its opposite end portions by generally Z-shaped brackets 39 having horizontal legs 40 suitably secured thereto. The Z-shaped brackets 39 define the outer ends of the plenum chambers 16.

The conduit portion or collar 13 of the valve housing 15 has a butterfly type of damper valve 46 mounted therein, and shown in FIGURES 2 and 3 as including two similar oppositely extending damper plates 47 mounted on a common pivot pin 48 extending across the damper housing and suitably supported thereon in spaced relation with respect to the top of the collar 13 on spaced upright supports 49 extending upwardly from a transverse support member 50, extending across the collar 13 intermediate the ends thereof and having an adjustment screw 51 threaded therein. The adjustment screw 51 has a stop member 53 pivotally mounted on the upper end thereof engaging the undersides of the damper plates 47. Turning of the adjustment screw 51 by a screw driver or the like, will thus raise or lower the stop 53 with respect to the fixed pivot pin 48, to open or close the damper valve in an obvious manner.

The inner ends of the plenum chambers 16 are defined by the wall or baffle 55, extending transversely of the plenum chamber between the top surface of the reflector 25 and the undersurface of the inverted pan 36. The baffle 55 divides the inverted pan 36 in half and is midway between the valve housings 15 and serves to keep down the endwise velocity components of the air and to thereby prevent a disproportionate quantity or velocity of flow where the streams of air entering the plenum chambers 16 through the valve housings 15 meet.

The reflector 25 is in the form of a flat plate extending for substantially the length of the troffer light housing 19 and terminating in spaced relation with respect to opposite sides thereof, shown in FIGURE 3 as being adjacent the point of juncture of the inwardly curved side walls 23 with the vertically extending walls 29. The spaces between the outer end portions of the reflector 25 and the upper end portions of the side walls 23 define air flow passageways 56 for the flow of air from the plenum chambers 16 downwardly along the side walls 23 in a substantially straight down direction. The reflector 25 has downwardly inclined baffles 57 extending for the length thereof and generally parallel to lines drawn tangent to the surfaces of the fluorescent tubes 24, and spaced radially therefrom. The baffles 57 terminate into baffles 59 of an inverted V-shape in cross-section, the end portions of which are generally parallel to the baffles 57 and serve to deflect the air along the inwardly turned walls 23 and to thereby prevent the air from contacting and cooling the fluorescent tubes 47 and reducing the lighting efficiency thereof.

Extending along the central portions of the passageways 56 in opposite directions from the baffle or wall 55 are horizontal baffles 52. The baffles 52 extend equal distances from the baffle 55 and are relatively short with respect to the length of the passageways 56 and keep down the vertical components of air passing through the passageways 56 at the adjacent ends of the plenum chamber 16, where the streams of air tend to meet.

The top surface of the reflector 25 forms in effect a flat baffle directly engaged by the incoming air entering the plenum chambers 16 through the valve housings 15 and causing the air to bounce off the flat plate and partially change the velocity head into static pressure. This is attained by the bouncing of the incoming air off the flat baffle plate, with the resultant creation of eddy currents, which will cause some of the velocity of the air to die and will thereby convert part of the velocity head to a static pressure head. The remaining velocity head will move the air down the length of the plenum chambers into engagement with the end walls formed by the Z bar support 39 and the baffle 55. The air, therefore, in a turbulent state will pass through the air passageways 56 in a straight down direction along the inwardly turned wall portions 23 to light traps 62 extending along opposite sides of the troffer light housing 19 beneath the shouldered portion 27 thereof and forming a support for the lens 58.

The light traps 62 on each side of the troffer light housing are of a similar construction except one light trap is shown as having a hinge member 68 extending upwardly from the outer lower end portion thereof and riveted or otherwise secured to an inwardly stepped wall portion 60 of the troffer light housing beneath the shoulder 27.

Each light trap 62 has a glass channel 61 opening toward the longitudinal center of the troffer light housing 19 for receiving and supporting the lens 58. Each light trap 62 also has a horizontal wall portion 63 spaced upwardly from the channel 61 by a plurality of spacers 65, forming spaced central air slots 66 in the spaces therebetween (FIGURE 5) and longitudinally spaced air slots 67 on opposite sides of said central air slots and extending for substantially the length of said light trap.

The horizontal wall portion 63 extends outwardly of the glass channel 61 and has a plurality of air slots 69 leading vertically therethrough along the vertical leg of an angle member 70 secured at its upper end to a vertical wall 71 of the light trap and defining the outer margins of the slot 69. The vertical wall 71 terminates into an inwardly extending horizontal wall 73 extending over the slots 69 and shielding said slots from the passage of light therethrough. The angle 70 has a horizontal leg 75 extending closely adjacent the inner wall of the troffer light housing and serving to further shield the troffer light housing from the passage of light therethrough. A plurality of spaced hinges 77 are secured to the troffer light housing 57, which in FIGURE 3 is shown as being the left hand troffer light housing at the juncture of the horizontal and vertical legs of the angle 70. The hinges 77 form a means for detachably securing the left hand light trap 62 to the troffer light housing 19 to accommodate removal and displacement of the glass lens 58. As herein shown, the hinges 77 each have a vertically extending leg having hooked end portions 79 adapted to extend through the apertures of apertured portions (not shown) of the shoulder 27 to hook the light trap 62 thereto and removably support the lens 58 in the troffer light housing with the lower surface thereof substantially flush with the lower surface of the flanges 29 of said troffer light housing.

It will be noted from FIGURES 2 and 4 that the air slots 67 of the light traps 62 terminate a substantial distance from opposite ends of said light traps, and that the center slots have smaller flow areas than the outwardly spaced slots 67. This reduces the flow areas at the center and ends of the troffer light housing and the wider spacers at the opposite ends of said light traps form in effect baffle means preventing a disproportionate flow at the ends of said light traps. The use of the openings provided by the slots 67 has the further advantage of transmitting incident light into the air discharge area, thereby avoiding dark areas alongside the longitudinal margins of the lens 17.

In this connection, as has already been described in connection with FIGURE 5 of the drawings with respect to the glass channel 61 opening towards the longitudinal center of the troffer light housing 19, the slots 67 also open in the same direction (FIGURE 5) and are, therefore, in an excellent alignment to transmit incident light from the trough into the air discharge area subjacent the horizontal wall portion 63, and which wall portion 63 is characterized by the air slots 69 leading vertically therethrough. Thus, the light trap means at the air discharge area prevents direct transmission of light through the air slot 69 but the additional openings 67 are so aligned with respect to the lighting trough as to transmit incident light rays from the trough into the air discharge area to avoid darkened areas beside the lens 58.

The light trap 62 besides reducing the endwise velocity components at the center and the ends of the troffer light housing 19 which would cause drafts where two units may be connected together, also create a turbulence in the air passing through the slots 66 and 67 and bouncing against the vertical legs of the angle 70 and commingling with the air passing through the slots 69, resulting in the discharge of the air along opposite sides of the troffer light housing in a plurality of turbulent whirling streams of air in a straight down direction, and in addition to providing no draft ventilation, readily mixing with the static air in the room.

It may be seen from the foregoing that the ventilating air entering the plenum chamber 16 on opposite sides of the baffles 55 is deflected by the flat baffle formed by the top surface of the reflector 25 with the result that the air bounces back and travels towards the sides of the plenum chamber and eddy currents are created therein, partially converting the velocity head to a static head, and that the remaining velocity head moving toward the center and ends of the plenum chamber is deflected by the baffle 55 and that the horizontal baffles 52 extending over the passageways 56 prevent a disproportionate quantity or velocity of flow where the streams entering the plenum chambers 16 through the valve housings 15 meet. The wall or baffle 55 and the flat baffles 52 thus divide the passageways 56 at the center thereof and the deflecting action of the baffle 55 keeps the endwise velocity components down to effect the discharge of the air straight downwardly along the passageways 56 along and through the light traps 62 with a minimum of endwise velocity components, and effect the uniform direction of the air through the light traps in a straight down direction in a plurality of turbulent streams.

While I have herein shown and described one form in which my invention may be embodied, it should be understood that various variations and modifications in the invention may be attained without departing from the spirit and scope of the novel concepts thereof as defined by the claims appended hereto.

I claim as my invention:

1. In a ceiling and no draft air and light distributor unit, a troffer light housing having upwardly and inwardly extending inner wall portions forming a light trough and having vertical wall portions forming a continuation thereof and forming a plenum chamber, a reflector extending along the upper margins of said upwardly and inwardly extending inner wall portions and extending substantially the length of said troffer light housing and spaced inwardly from said inner wall portions to form air passageways from said plenum chamber along said inner wall portions, a plurality of fluorescent tubes in said light trough beneath said reflector arranged in parallel spaced relation with respect to each other, the outermost of said fluorescent tubes being spaced inwardly of said air passageways, spaced air inlets into said plenum chamber from the top thereof spaced equally distant from opposite ends of said plenum chamber, and a wall extending transversely of said plenum chamber intermediate said air inlets dividing said plenum chamber in half and reducing the endwise velocity components of air where the streams of air tend to meet at the center of said plenum chamber, and thereby preventing the streams of air entering said plenum chamber through said inlets from joining as they pass downwardly through said passageways.

2. A ceiling no draft air and light distributor unit in accordance with claim 1, wherein horizontal baffles extend over said air passageways in opposite directions from opposite ends of said wall for a portion of the length of said plenum chamber, to prevent the discharge of a disproportionate quantity of air where the streams of air tend to meet.

3. A ceiling no draft air and light distributor unit in accordance with claim 1, wherein a glass lens closes the bottom of the troffer light housing and wherein light traps support said lens and have vertical discharge passageways and horizontal and vertical inlet passageways leading thereinto to effect the bouncing off of the streams of air passing through said horizontal and vertical inlet passageways and the discharge of the air through said vertical discharge passageways in a series of turbulent streams in a straight down direction.

4. In a ceiling no draft air and light distributor unit, a troffer light housing having upwardly and inwardly extending inner side walls forming light reflective surfaces, a reflector extending along said troffer light housing for substantially the length thereof and terminating in spaced relation with respect to said inwardly extending inner side walls and defining a light trough beneath said reflector and a plenum chamber above said reflector, more than two parallel spaced fluorescent tubes extending along said light trough beneath said reflector and inwardly of said air passageways, said reflector having baffled side portions baffling the air from said fluorescent tubes, at least two inlets into said plenum chamber from the top thereof spaced equally distant from opposite ends thereof, a top surface of said reflector forming a fat baffle creating eddy currents in the air entering said plenum chamber and partially changing the velocity head of the air entering said plenum chamber into a static head, and baffle means extending transversely of said plenum chamber over said air passageways and intermediate said air inlets, preventing the high static and velocity heads of air entering said plenum chamber from merging at the center thereof and causing a disproportionate quantity or velocity of flow of air from the center of said plenum chamber.

5. A ceiling no draft air and light distributor unit in accordance with claim 4, wherein a lens extends along the bottom of the troffer light housing and wherein the lens is supported on light traps extending along each side of the troffer light housing, and has horizontal air inlet passageways and vertical air discharge passageways extending therealong for directing the air in a straight downward direction in a plurality of turbulent streams.

6. A ceiling no draft air and light distributor unit in accordance with claim 5, wherein the light traps are baffled adjacent their opposite ends and wherein the baffle means extending transversely of the plenum chamber over the air passageways and intermediate the air inlets comprises short horizontal baffles extending along the air passageways intermediate the ends thereof, to prevent a disproportionate quantity or velocity of flow of air from the ends and center of said light trough.

7. A ceiling no draft air and light distributor unit in accordance with claim 4, wherein light traps extend along each side of the light trough adjacent the bottom thereof, wherein a glass lens is supported by said light traps, wherein each light trap includes a slot opening to the bottom of said light trough a series of spaced horizontally extending slots opening to said slot, a series of spaced vertically extending slots opening directly to said first mentioned slot opening to the bottom of said light trough, shielding means for said vertically extending slots including a horizontal wall spaced above and extending over said vertically extending slots, and said horizontally extending slots stopping short of the ends of said light traps and thereby preventing a disproportionate quantity and velocity of flow along the ends of said lighter trough.

8. In combination with the ceiling of a space to be illuminated and ventilated, a false ceiling spaced below said ceiling, a supply duct extending into the space above said false ceiling, a combination air and light distributor unit in said false ceiling including a troffer light housing having side wall portions received in and engaging the edges of an opening in said false ceiling, and having wall portions forming a lighting trough recessed above said false ceiling, a reflector in said lighting trough extending for substantially the length thereof and spaced inwardly from said wall portions, the spaces between said reflector and said wall portions forming downwardly opening air discharge passageways, a series of elongated fluorescent tubes supported in said lighting trough in side by side relation with respect to each other, a plenum chamber above said reflector, spaced air inlets connected with said supply duct and leading downwardly into said plenum chamber at equally spaced distances from the transverse center thereof, said reflector having an upper surface forming a flat baffle beneath said air inlets, bouncing the incoming air entering said plenum chamber through said air inlets into eddy currents and thereby dissipating the vertical velocity head by turbulence, and two aligned horizontally extending baffles in said plenum chamber extending transversely thereof over said air discharge passageways for a portion of the length of said plenum chamber midway between the ends thereof, for reducing the endwise velocity components of air in said plenum chamber and preventing the merging of the turbulent streams of air from said air inlets, and thereby accommodating the air to be directed straight downwardly through said passageways along said inwardly turned side walls.

9. In the combination of claim 8, a wall extending transversely of said plenum chamber for the width thereof and over said horizontally extending baffles and reducing the endwise velocity components of air at the center of said plenum chamber and cooperating with said horizontally extending baffles to prevent the discharge of a disproportionate quantity of air at the transverse center of said troffer light housing.

10. In the combination of claim 8, a light trap extending along the lower end portions of each of said inwardly turned side walls, a glass lens supported by said light traps and light shielded horizontal and vertically extending passageways in said light traps directing the air straight downwardly from said light traps at low turbulent velocity heads.

11. In a ceiling and no draft air and light distributor unit, a troffer light housing having upwardly and inwardly extending wall portions forming a light trough, a reflector adjacent the upper ends of said upwardly and inwardly extending wall portions, and a plenum chamber above said reflector, at least one air inlet into said plenum chamber, a lens extending along the bottom of said troffer light housing, and means supporting said lens and accommodating the discharge of air from said troffer light housing along opposite sides thereof in a straight down direction comprising light traps extending along the lower end portions of said upwardly and inwardly extending wall portions, said light traps having facing lens slots formed therein, and also having discharge slots opening to the bottoms of said light traps, a series of horizontally extending slots opening to said discharge slots, a series of vertically extending slots opening to said discharge slots, and wall means spaced above and extending over said vertically extending slots shielding said vertically extending slots from light.

References Cited in the file of this patent

UNITED STATES PATENTS

| | | |
|---|---|---|
| 2,066,544 | Shaw | Jan. 5, 1937 |
| 2,564,334 | Kennedy | Aug. 14, 1951 |
| 2,845,855 | Burns | Aug. 5, 1958 |
| 2,902,917 | Peterson | Sept. 8, 1959 |